United States Patent [19]

Onoe

[11] Patent Number: 5,113,299
[45] Date of Patent: May 12, 1992

[54] MAGNETIC HEAD WITH IMPROVED BONDING BETWEEN MAGNETIC CORE HALVES

[75] Inventor: Atsushi Onoe, Saitama, Japan

[73] Assignee: Pioneer Electronic Corporation, Tokyo, Japan

[21] Appl. No.: 498,071

[22] Filed: Mar. 23, 1990

[30] Foreign Application Priority Data

Jul. 24, 1989 [JP] Japan .................................. 1-188721

[51] Int. Cl.⁵ ............................ G11B 5/23; G11B 5/31
[52] U.S. Cl. ...................................... 360/120; 360/126
[58] Field of Search ................................ 360/120, 126

[56] References Cited

U.S. PATENT DOCUMENTS 3,578,920 5/1971 Okamoto et al. .................... 360/120

FOREIGN PATENT DOCUMENTS 60-187910 9/1985 Japan .................................. 360/120

Primary Examiner—Robert S. Tupper
Attorney, Agent, or Firm—Sughrue, Mion, Zinn Macpeak & Seas

[57] ABSTRACT

A magnetic head according to the present invention comprises two halves of magnetic core which are put together with a spacer for forming a magnetic gap between the two halves. The two havles are bonded together by charging glass into grooves near the magnetic gap to form a core block. A thin film is deposited to an area near the gap spacer, or to the area near the gap spacer and an surface of the gap spacer and the glass is charged on the thin film, thereby improving wettability by the glass.

7 Claims, 8 Drawing Sheets t ≤ GAP LENGTH/2 t ≤ GAP LENGTH/2

MAGNETIC HEAD WITH IMPROVED BONDING BETWEEN MAGNETIC CORE HALVES

BACKGROUND OF THE INVENTION

1. Field of the Invention

This invention relates to a magnetic head of a construction in which two halves of core are joined together with a gap spacer therebetween, and more particular to a magnetic head used for an information recording and reproducing apparatus such as VTR and DAT.

2. Prior Art

FIG. 14 illustrates a structure before cutting process of one conventional magnetic head of a construction in which two halves of a core are joined together with a gap spacer sandwiched therebetween to form a magnetic gap. The gap spacer is made of, for example, a non-magnetic and hard material such as $Al_2O_3$ and $SiO_2$. The two core halves 3 made of magnetic material are formed with a winding groove 5 and track grooves 4 on the joint surfaces thereof. These joint surfaces are then mirror-polished, and are then deposited with a layer of $Al_2O_3$ or $SiO_2$ of a required thickness thereon by means of deposition or sputtering to form a gap spacer 1 as shown in FIG. 15. Then, as shown in FIG. 16, molten glass 2 is charged into the grooves 4 to securely combine the core halves together, forming a core block 8. The glass 2 is also charged into a bonding glass filling groove defined by portions 7 when the two halves are put together. Then, the core block 8 is cut along lines XVII—XVII into individual magnetic heads.

Generally, $Al_2O_3$ does not exhibit good wettability by the glass 2, therefore when $Al_2O_3$ is to be used as the gap spacer 1, it is difficult to adequately charge the glass in the vicinity of the gap. $SiO_2$ is often corroded by the glass as shown at reference numeral 9 in FIG. 17, causing a difficulty of providing a reliable gap across the track.

SUMMARY OF THE INVENTION

A magnetic head comprises two halves of magnetic core which are put together with a gap spacer chiefly made of $Al_2O_3$ for forming a magnetic gap between the two halves. The two halves are bonded to each other by charging glass into grooves near the magnetic gap to form a core block. A thin film is deposited to an area near the gap spacer, or to the area and a surface of the gap spacer before the glass is charged, thereby improving wettability by the glass. The thin film is preferably made of $SiO_2$ having a thickness of more than 10 Å.

BRIEF DESCRIPTION OF THE DRAWINGS

Features and other objects of the invention will be more apparent from the description of the preferred embodiments of the invention with reference to the accompanying drawings in which.

DESCRIPTION OF THE PREFERRED EMBODIMENTS

A First Embodiment

Figure 1:
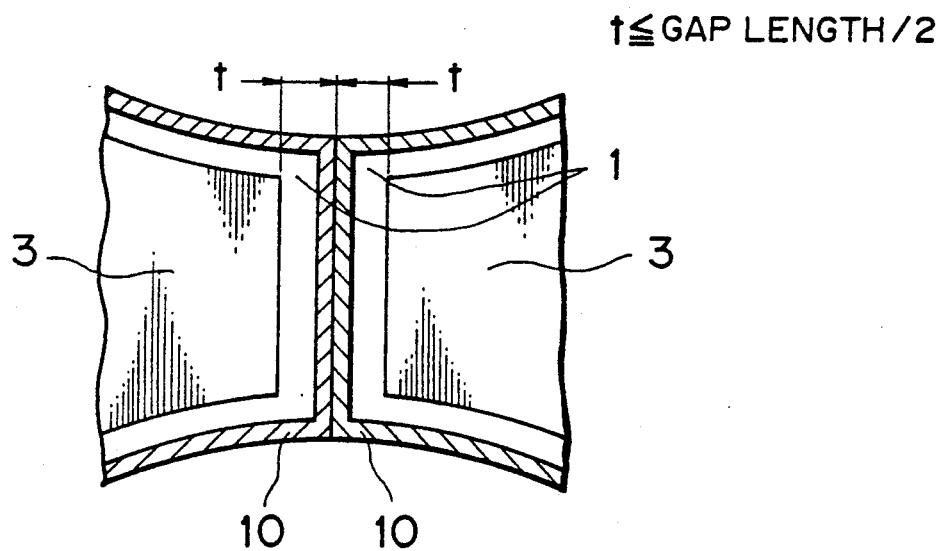
FIG. 1 shows a front view of a first embodiment of a magnetic head according to the invention.
Figure 2:
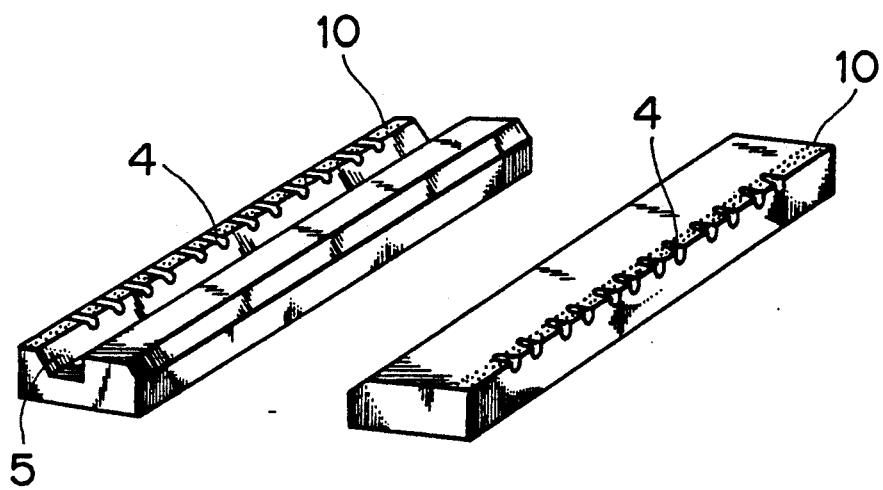
FIG. 2 is a perspective view of the two halves of the core of which the magnetic head in FIG. 1 is made.
Figure 16:
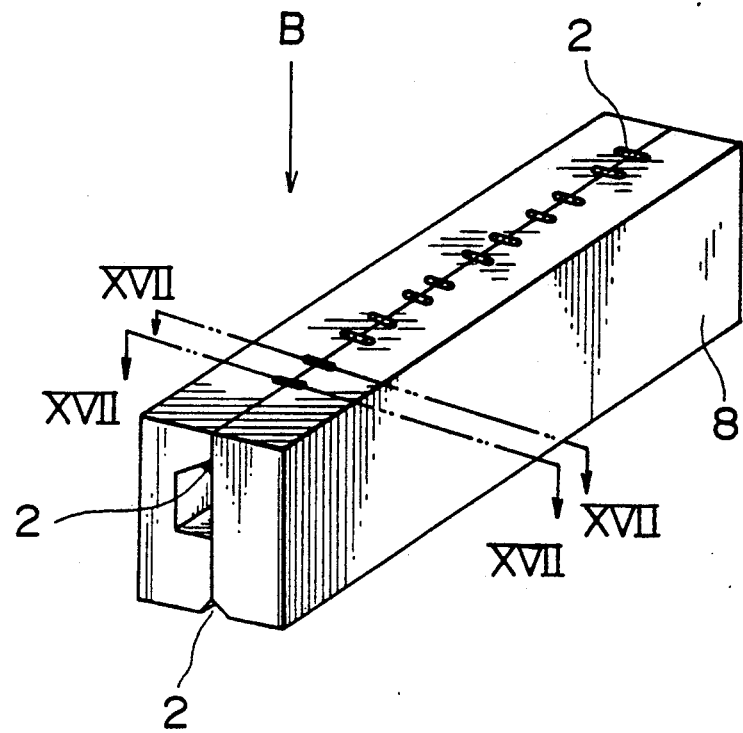
FIG. 16 shows the core assembly in FIG. 16, which is to be cut along lines XVII—XVII.
Figure 17:
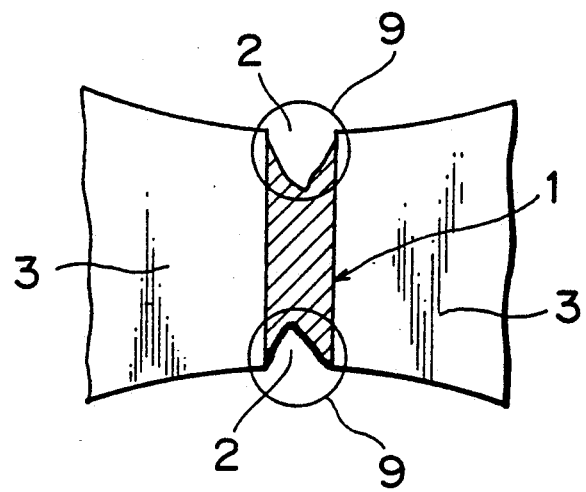
FIG. 17 shows a top view of a prior art magnetic head the gap of which is corroded by glass charged.

FIG. 1 is a front view of a first embodiment of a magnetic head according to the invention and FIG. 2 is a perspective view of the two halves of the core of which the magnetic head in FIG. 1 is made. A winding groove 5 and track grooves 4 are formed on the joint surfaces of the cores 3 and the surfaces are mirror-polished. Then, $Al_2O_3$ is deposited as a gap spacer 1 on the joint surfaces of the respective halves to a thickness less than one-half t of a desired gap length through sputtering or deposition. Thereafter, a thin film 10 of $SiO_2$ of a thickness of more than 10 Å is deposited as a second" gap spacer on the $Al_2O_3$ spacer through sputtering or deposition. The thin film 10 is deposited in the area at least near the gap where the glass is to be filled as shown in FIG. 1. The thin film of $SiO_2$ improves the wettability by glass to ensure charging of glass when the two halves are put together and the glass is charged as shown in FIG. 16. The gap spacer 10 may be made of various materials such as non-magnetic metal film and non-magnetic metal oxide thin film provided that they have good wettability by glass and can be made in the form of a thin film.

Figure 3:
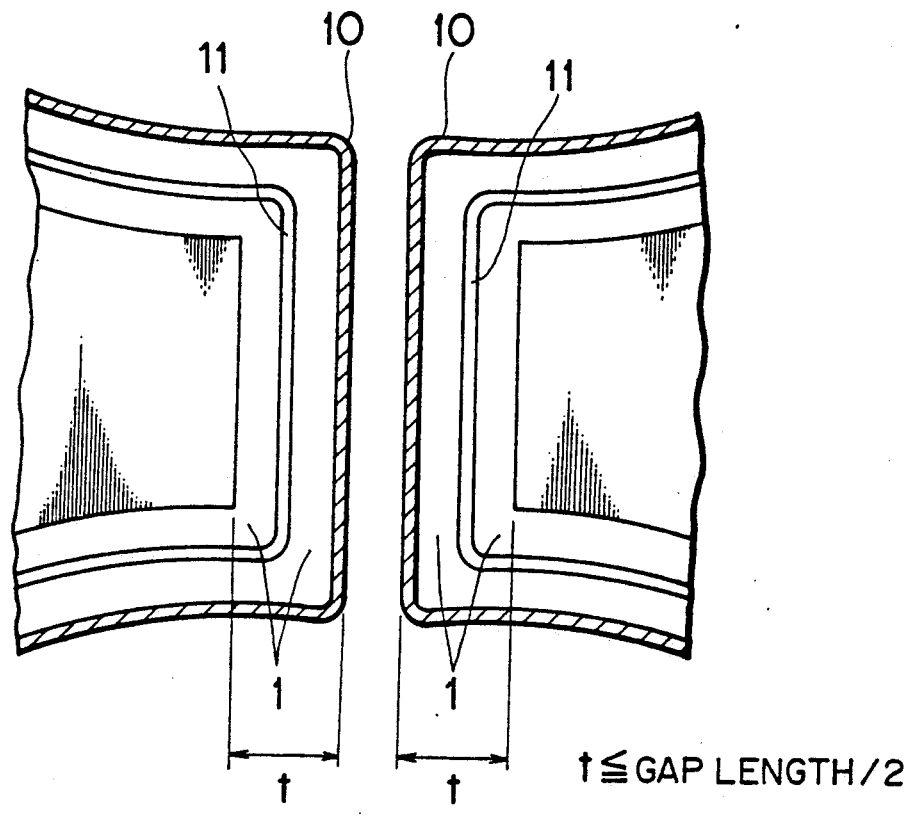
FIG. 3 illustrates the gap of the magnetic head in FIG. 1, formed in a multi-layer construction.

By this arrangement, even if the thin film of $SiO_2$ is corroded somewhat by the glass when charging the glass, the magnetic gap can still be formed reasonably across the track width since the main gap spacer of $Al_2O_3$ is hardly corroded by the glass. While the first embodiment has been described as being formed in a dual layer construction of $Al_2O_3$ and $SiO_2$, as far as the outermost layer is made of $SiO_2$ of a thickness of more than 10 Å, the gap spacer may be of a multi-layer construction as shown in FIG. 3 where $Al_2O_3$ and $SiO_2$ are laid one over the other in a multi-layer structure. Further, the gap spacer 1 of $Al_2O_3$ may be applied on only one of the halves 3 of core.

A Second Embodiment

Figure 4:
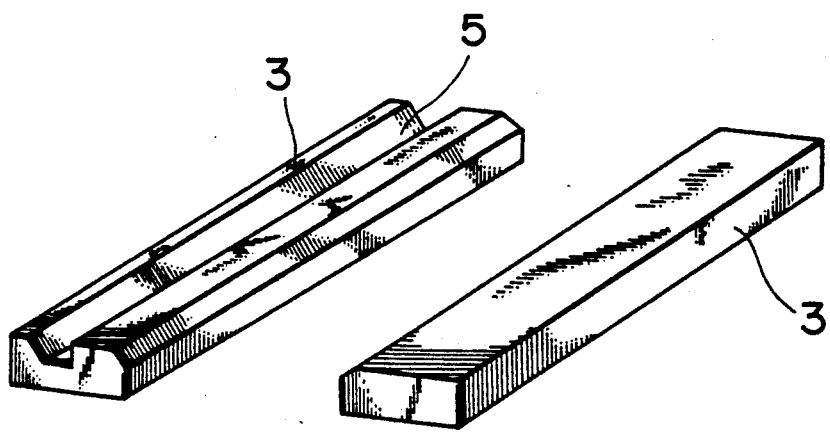
FIG. 4 shows the two halves of the core of a second embodiment.
Figure 5:
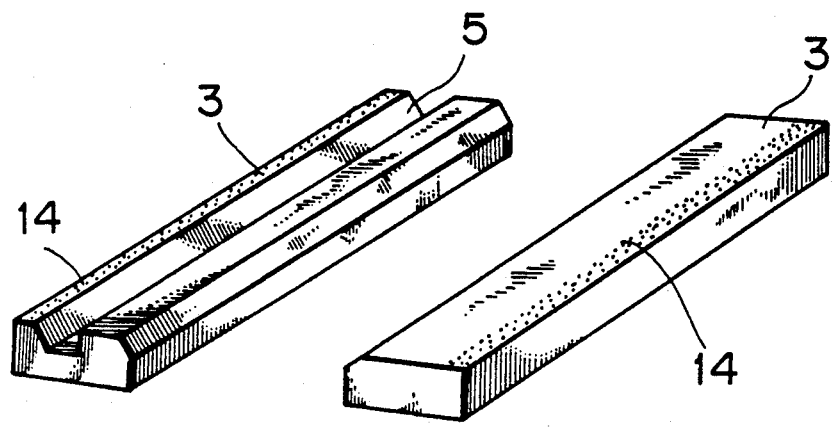
FIG. 5 shows the two halves of the core in FIG. 4 to which a thin film of $Al_2O_3$ is applied.
Figure 6:
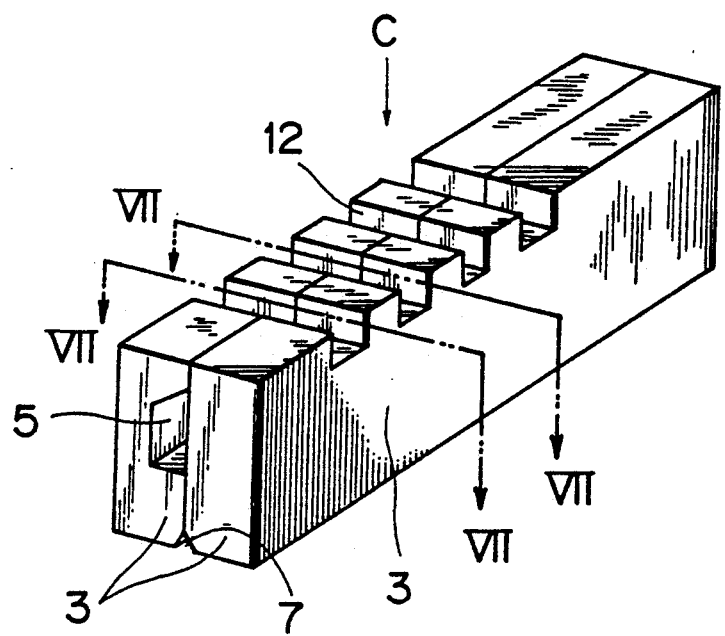
FIG. 6 shows the halves of core in FIG. 4 which are formed with track grooves thereon.

One of the halves 3 of core is formed with a winding groove 5 as shown in FIG. 4, and as shown in FIG. 5 a spacer 14 of $Al_2O_3$ is applied to the respective halves to a thickness of less than a half the required gap length through sputtering or deposition. Then, the two halves are put together with the gap spacer 1 being sandwiched therebetween. If the core is made of a metal magnetic material (e.g. Sendust), the halves 3 of core are silver-soldered together at a groove 7 and then the assembly is formed with track grooves 12 thereon as shown in FIG. 6.

Figure 7:
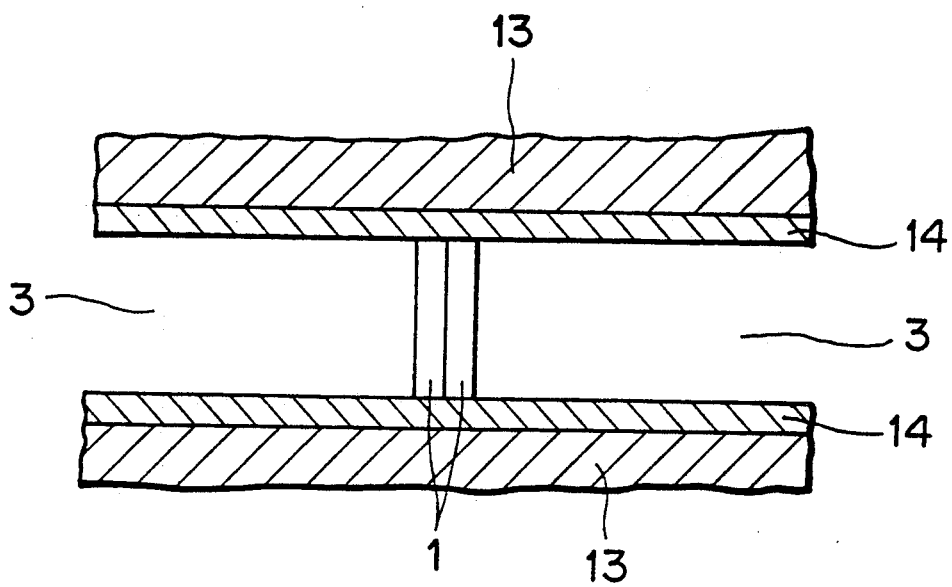
FIG. 7 shows a front view of a magnetic head of the second embodiment, seen in a direction C in FIG. 6.

A thin film 14 such as $SiO_2$ for improving wettabilty of the core by glass 13 is deposited into the track grooves 12 through thin film forming process, and the glass 13 is then charged into the grooves 12 and the groove 7. The halves thus joined together are cut at the charged glass 13 along lines VII—VII in FIG. 6 to form individual magnetic heads. It should be noted that the length of the gap is given only by the thickness of the gap spacer 1 as shown in FIG. 7 and is independent of the thickness of the thin film 14, preventing the gap length from increasing.

A THIRD EMBODIMENT

Figure 8:
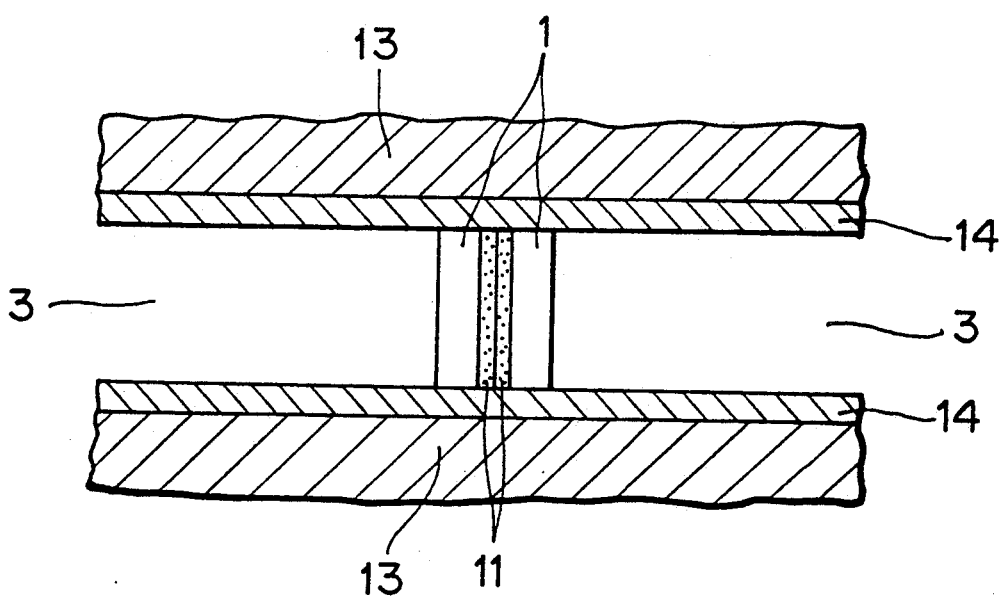
FIG. 8 shows a third embodiment of the invention.

FIG. 8 shows a third embodiment of the invention in which a thin film 11 similar to the film 14 of the second embodiment is formed on the surface of the gap spacer 1 of $Al_2O_3$.

A FOURTH EMBODIMENT

Figure 9:
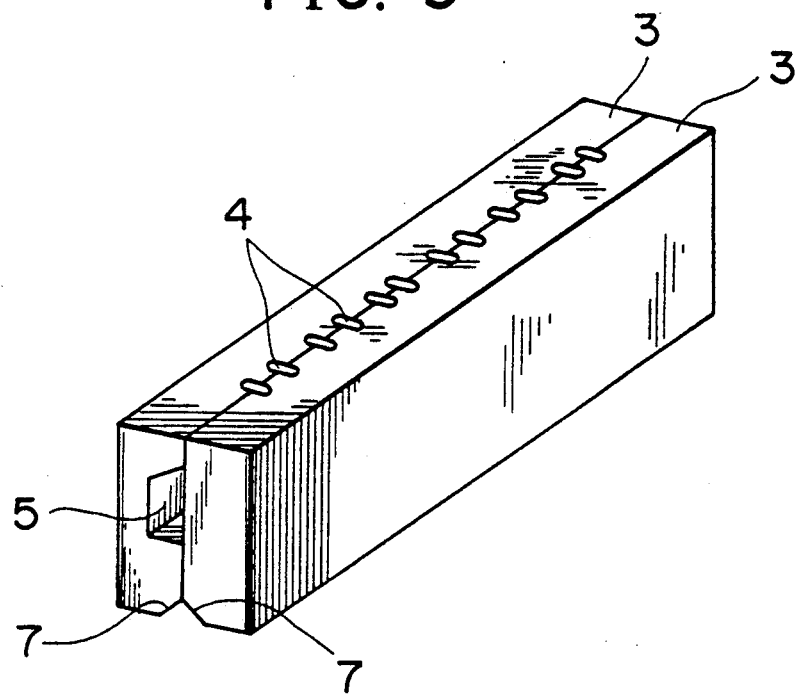
FIG. 9 shows a fourth embodiment of the invention.
Figure 10:
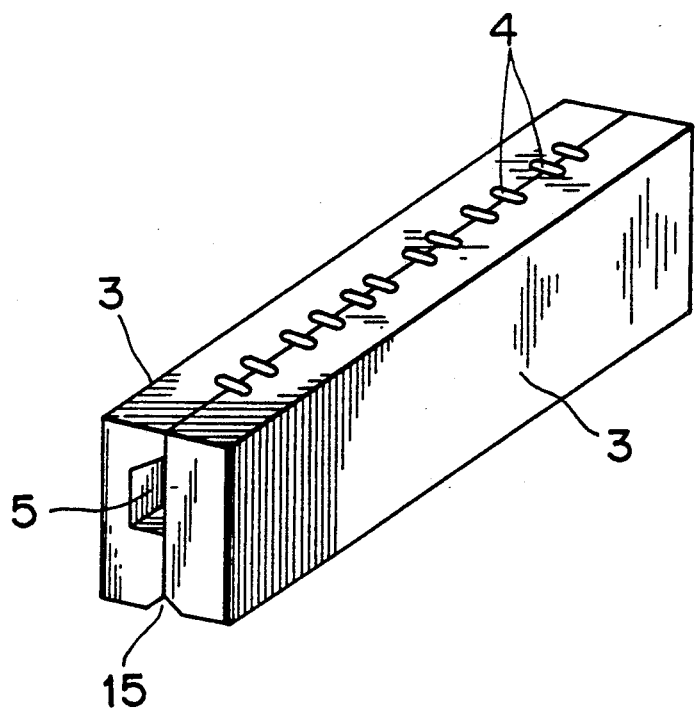
FIG. 10 shows the two halves of the cores in FIG. 9 which are charged glass of a high melting point into a groove.
Figure 11:
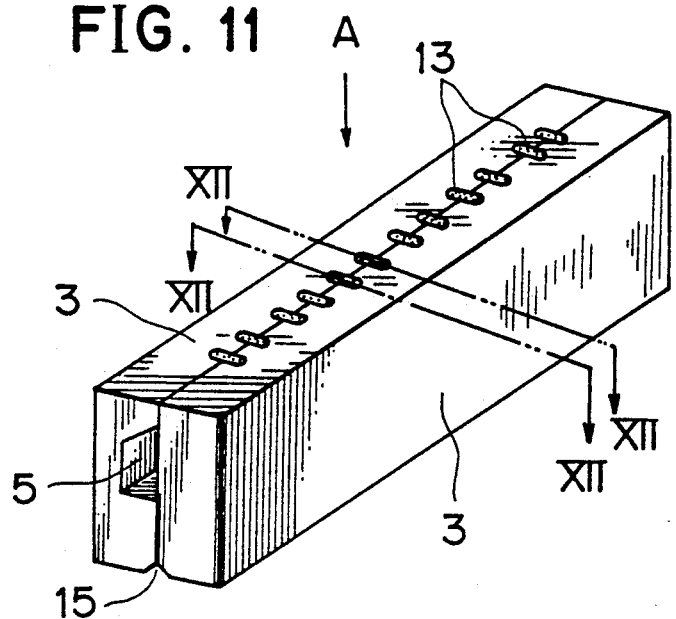
FIG. 11 shows the core assembly in FIG. 10, which is to be cut along lines XII—XII.
Figure 12:
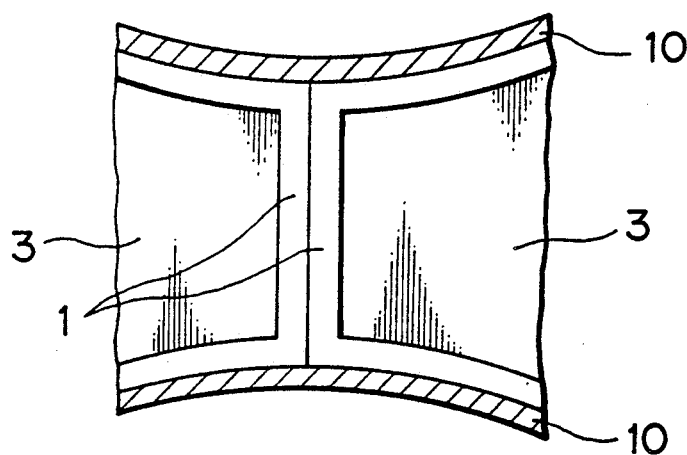
FIG. 12 is an expanded front view of the magnetic head of the fourth embodiment.
Figure 13:
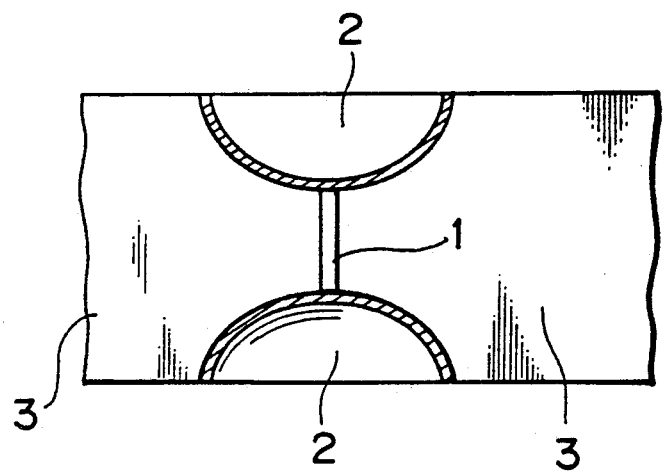
FIG. 13 is a top view of the magnetic head seen in a direction A in FIG. 11.
Figure 14:
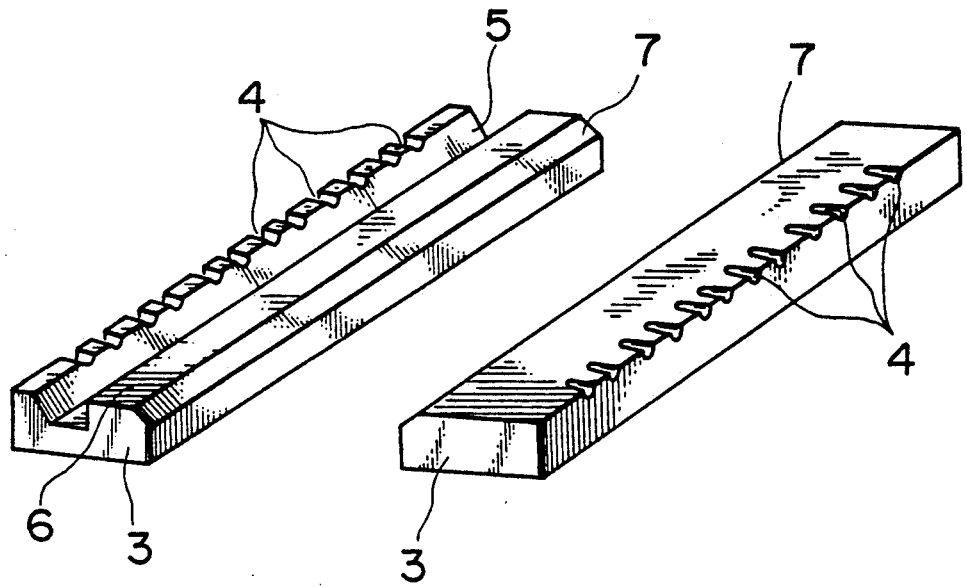
FIG. 14 illustrates one conventional magnetic head.
Figure 15:
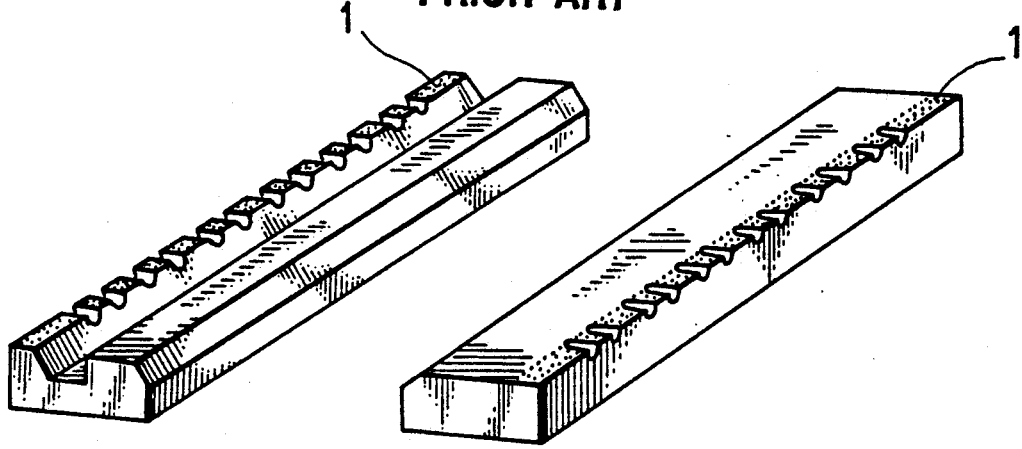
FIG. 15 shows the two core halves in FIG. 14 to which a gap spacer is appliedf

As shown in FIG. 9, the two core halves 3 of magnetic material are formed with a winding groove 5 and track grooves 4 thereon, which are the same as those for the first embodiment. The joint surfaces of the two halves are mirror-polished, and a thin film such as $Al_2O_3$ and $SiO_2$ is deposited thereon by means of deposition or sputtering to form a gap spacer 1 as shown in FIG. 2. Then, as shown in FIG. 10, glass 15 of a high melting point is charged into a groove 7 as shown in FIG. 10 to securely combine the two halves. If the core halves 3 are made of a metal magnetic material, the groove 7 may be charged with silver solder. The core block thus assembled is applied a thin film 10 to the groove 4 thereon for improved wettability by glass, and then glass 2 is charged into the grooves 4 as shown in FIG. 11. When the high melting point glass 15 is to be used for bonding the two halves at the groove 7, glass 2 having a melting point lower than that of the glass 15 is filled in the track grooves 4. Then, the core assembly is cut along lines XII—XII as shown in FIG. 11 to form individual magnetic heads. FIG. 13 is a front view of a magnetic head seen in a direction A in FIG. 11, and FIG. 12 is an enlarged front view of the magnetic head in FIG. 13. It should be noted that the thin film 10 is not applied to the joint surfaces of the gap spacer 1.

What is claimed is:

1. A magnetic head comprising:
   two magnetic core halves, each having a gap-defining surface and track grooves, wherein said gap-defining surfaces are arranged adjacent to one another,
   a gap spacer positioned to form a magnetic gap between said gap-defining surfaces,
   a thin film layer within said track grooves,
   bonding glass applied upon said thin film layer, wherein said thin film layer improves the wettability characteristic between said bonding glass and said track grooves.

2. A magnetic head according to claim 1, wherein said gap spacer is made of $Al_2O_3$.

3. A magnetic head according to claim 1, wherein said thin film layer is made of a non-magnetic metal film or a non-magnetic metal oxide thin film.

4. A magnetic head according to claim 1, wherein said track grooves include a plurality of grooves transverse to said gap defining surface and said magnetic head further includes a single groove parallel to said gap-defining surface containing a bonding glass, said transverse grooves containing bonding glass having a lower melting point than the melting point of the bonding glass contained within said single groove.

5. A magnetic head according to claim 1, wherein said track grooves include a plurality of grooves transverse to said gap defining surface and said magnetic head further includes a single groove parallel to said gap-defining surface, said single groove containing silver-solder.

6. A magnetic head according to claim 1, wherein said gap spacer includes a spacer layer formed on each corresponding gap defining surface, and on additional layer said thin film is deposited on each of said gap spacer layers.

7. A magnetic head according to either one of claims 6 or 1, wherein said thin film is made of $SiO_2$ having a thickness of more than 10 Å.

* * * * *

UNITED STATES PATENT AND TRADEMARK OFFICE
CERTIFICATE OF CORRECTION

PATENT NO. : 5,113,299
DATED : May 12, 1992
INVENTOR(S) : Atsushi ONOE It is certified that error appears in the above-identified patent and that said Letters Patent is hereby corrected as shown below:

Abstract, line 4, delete "havles" and insert --halves--.

col. 2, line 20, delete "appliedf" and insert --applied;--.

col. 4, line 41, delete "on" and insert --an--;
line 42, before "said thin film" insert --of--.

Signed and Sealed this

Fourteenth Day of September, 1993

BRUCE LEHMAN

*Attest:*

*Attesting Officer*

*Commissioner of Patents and Trademarks*